(12) United States Patent
Wegener

(10) Patent No.: US 12,404,919 B2
(45) Date of Patent: Sep. 2, 2025

(54) LINEAR DRIVE

(71) Applicant: FESTO SE & CO. KG, Esslingen (DE)

(72) Inventor: Andreas Wegener, Stuttgart (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/847,044

(22) PCT Filed: Mar. 15, 2023

(86) PCT No.: PCT/EP2023/056566
§ 371 (c)(1),
(2) Date: Sep. 13, 2024

(87) PCT Pub. No.: WO2023/174988
PCT Pub. Date: Sep. 21, 2023

(65) Prior Publication Data
US 2025/0207658 A1  Jun. 26, 2025

(30) Foreign Application Priority Data
Mar. 18, 2022 (DE) .................. 10 2022 106 373.9

(51) Int. Cl.
*F16H 25/24* (2006.01)
*F16C 27/06* (2006.01)
*F16H 25/20* (2006.01)

(52) U.S. Cl.
CPC ............ *F16H 25/24* (2013.01); *F16C 27/066* (2013.01); *F16H 2025/204* (2013.01); *F16H 2025/2436* (2013.01)

(58) Field of Classification Search
CPC .............. F16H 25/24; F16H 2025/204; F16H 2025/2436; F16C 19/527; F16C 27/06;
(Continued)

(56) References Cited

U.S. PATENT DOCUMENTS 8,495,924 B2 * 7/2013 Fukano ............... F16H 25/2454
74/89.44
9,279,450 B2 * 3/2016 Zaike ..................... F16H 19/04
(Continued)

FOREIGN PATENT DOCUMENTS

DE  10 2009 007 958  4/2012
DE  10 2013 005 731  10/2014
(Continued)

OTHER PUBLICATIONS

Examination Report issued in corresponding German Patent Application No. 10 2022 106 373.9, Feb. 8, 2023, 8 pages.
(Continued)

*Primary Examiner* — Bobby Rushing, Jr.
(74) *Attorney, Agent, or Firm* — HSML P.C.

(57) ABSTRACT

A linear drive includes an output member which is linearly movable with respect to a drive housing, and which has a spindle nut and a hollow output rod connected thereto. The output member is linearly displaceable by means of a rotationally drivable threaded spindle, which is inserted through the spindle nut into the output rod. To support the threaded spindle, a support apparatus is provided at its anterior end section, which has a rolling bearing and a sliding sleeve seated thereon. The sliding sleeve is divided into sliding sleeve segments, which are connected to one another by resilient joints and are each prestressed with a support area section against the inner peripheral surface of the output rod.

20 Claims, 3 Drawing Sheets

(58) Field of Classification Search
CPC ........ F16C 27/066; F16C 31/04; F16C 33/20; F16C 35/12
See application file for complete search history.

(56) References Cited

U.S. PATENT DOCUMENTS

| | | | |
|---|---|---|---|
| 9,482,327 B2 * | 11/2016 | Kondo | F16H 25/2204 |
| 10,919,386 B2 * | 2/2021 | Seipel | F16F 1/3842 |
| 2013/0248280 A1 | 9/2013 | Stamm et al. | |
| 2014/0300228 A1 | 10/2014 | Rapp et al. | |
| 2018/0328472 A1 | 11/2018 | Kuster et al. | |

FOREIGN PATENT DOCUMENTS

| | | | | |
|---|---|---|---|---|
| DE | 10 2013 215 865 | | 2/2015 | |
| DE | 10 2014 213 505 | | 1/2016 | |
| DE | 102016106237 A1 * | | 10/2017 | ........... B62D 5/0403 |
| EP | 2 394 354 | | 12/2011 | |
| EP | 2 651 745 | | 6/2016 | |
| EP | 3 401 571 | | 11/2018 | |
| JP | 6154648 B2 * | | 6/2017 | ............. F16H 25/20 |

OTHER PUBLICATIONS

International Search Report issued in International Application No. PCT/EP2023/056566, Aug. 18, 2023, 5 pages w/ translation.
Written Opinion issued in International Application No. PCT/EP2023/056566, Aug. 18, 2023, 6 pages.

* cited by examiner

LINEAR DRIVE

This application claims priority to DE 10 2022 106 373 A1, filed 18 Mar. 2022, which is incorporated herein by reference.

BACKGROUND OF THE INVENTION

The invention relates to a linear drive,
with a drive housing extending along a housing longitudinal axis, which drive housing encloses a housing interior in which a linearly movable output member extends axially, which output member projects out of the drive housing with an anterior end section usable for force applying and which output member has a hollow output rod in which a rod cavity open at the rear is formed,
wherein the output member has a spindle nut which is arranged in the housing interior and is secured against rotation with respect to the drive housing, wherein a threaded spindle passes through the spindle nut, wherein the threaded spindle is in threaded engagement with the spindle nut and has a spindle longitudinal axis extending in the axial direction of the housing longitudinal axis, which threaded spindle, starting from a rear end section of the drive housing, projects through the spindle nut into the rod cavity and can be driven by a rotary drive apparatus, which performs a rotary drive movement about the spindle longitudinal axis, resulting in a linear output movement of the output member relative to the drive housing,
wherein an anterior end section of the threaded spindle positioned in the rod cavity is radially supported on an inner peripheral surface of the output rod radially bounding the rod cavity by a support apparatus which has a sliding sleeve coaxial with the threaded spindle, on which sliding sleeve a support area extending in a spindle peripheral direction around the spindle longitudinal axis is formed radially on the outside, along which support area the output rod slides with its inner peripheral surface during its output movement.

A linear drive of this type known from DE 10 2013 005 731 A1 has a drive housing and an output member extending in the drive housing and projecting out of the drive housing at a front side of the housing. The output member has a hollow output rod to which a sleeve-shaped spindle nut is attached at the rear, in which a threaded spindle engages, which can be driven in rotation by an electric motor positioned at the rear of the drive housing. As the spindle nut is secured against rotation with respect to the drive housing, a rotation of the threaded spindle caused by the electric motor results in a linear output movement of the output member. The threaded spindle extends into the hollow output rod and is radially supported in the area of its anterior end section via a support apparatus on the inner peripheral surface of the hollow output rod. The support apparatus consists of a sliding sleeve known as a sliding bush, which has a support area on the radial outside with which it bears against the inner peripheral surface of the hollow output rod with radial support in such a way that the output rod can perform the linear output movement. Tolerance-related radial play in the sliding bearing area between the sliding sleeve and the output rod can cause unwanted running noises and increased wear, as even the slightest imbalance in the drive train can cause the threaded spindle or even the entire linear drive to vibrate. In order to achieve the lowest possible radial play in the area of the sliding sleeve, the sliding sleeves used to the present are usually selectively provided with suitable dimensions, which involves increased assembly effort and not inconsiderable storage costs. Nevertheless, for functional reasons, a certain radial play cannot be undercut, as the temperatures occurring during operation lead to thermal expansion, which can result in increased friction or even jamming of the components moving relative to each other if the radial play is too low.

A power steering system is known from EP 2 651 745 B1, which has a threaded spindle on which a ball nut is mounted that can rotate relative to a frame, the rotary movement of which results in an axial movement of the threaded spindle. The ball nut is rotatably mounted on the frame by means of a ball bearing. Damping elements are inserted between the outer ring of the ball bearing and the frame.

SUMMARY OF THE INVENTION

The problem underlying the invention is to create a linear drive provided with a threaded spindle, which has good running behavior with a simple and cost-effective configuration and causes only low running noise.

In order to solve this problem, for a linear drive of the type mentioned at the beginning, it is provided that the support apparatus has a rolling bearing positioned on the threaded spindle and supporting the sliding sleeve, which rolling bearing allows the threaded spindle to rotate relative to the sliding sleeve,
and that the sliding sleeve is divided into a plurality of sliding sleeve segments which are positioned in succession in the spindle peripheral direction and are connected to one another via resilient joints, so that they can be pivoted independently of one another in a radial direction relative to one another and relative to the rolling bearing by a respective swivel area with respect to the spindle longitudinal axis, wherein the support area is formed by support area sections formed on the individual sliding sleeve segments and elastically flexibly prestressed against the inner peripheral surface of the output rod by the resilient joints.

In this way, the threaded spindle is supported radially without play in relation to the output rod, regardless of manufacturing tolerances and temperature fluctuations, in a way that enables smooth linear output movement of the output member equipped with the output rod. The sliding sleeve is segmented in the spindle peripheral direction and divided into individual sliding sleeve segments, each of which has a common support area section forming the support area. Adjacent sliding sleeve segments are connected to each other via resilient joints in such a way that they are elastically prestressed with the support area sections against the inner peripheral surface of the output rod, whereby the resilience enables independent pivoting movements of the sliding sleeve segments in a radial direction with respect to the spindle longitudinal axis in order to maintain constant contact with the inner peripheral surface of the output rod. In addition, the rolling bearing of the support apparatus integrated between the sliding sleeve and the threaded spindle enables the rotational movement of the threaded spindle to be separated from the translational output movement of the output member, so that the relative speed at the sliding points between the output rod and the sliding sleeve segments is reduced, which contributes to a reduction in friction-related wear and operational heat generation.

The sliding sleeve is preferably configured in such a way that the swivel areas of all sliding sleeve segments defined by the resilient joints lie in a common plane orthogonal with respect to the spindle longitudinal axis, which is referred to as the hinge plane for better differentiation. In relation to the longitudinal direction of the threaded spindle, the swivel areas are accordingly at the same axial height.

The resilient joints which are each positioned between two sliding sleeve segments which are adjacent to one another in the spindle peripheral direction are realized in particular as solid state hinges which are integrated in one piece in the sliding sleeve, whereby they each consist of a resiliently twistable bar section of the sliding sleeve which is formed in one piece with the two sliding sleeve segments which are adjacent to one another in the spindle peripheral direction. The function is comparable to that of a torsion spring bar. The material bar forming the bar section, which is preferably made of the same material as the sliding sleeve segments, is twisted, i.e. torsioned, when the two associated sliding sleeve segments swivel, wherein a restoring force builds up which ensures that the sliding sleeve segments with the support area sections are constantly prestressed against the inner peripheral surface of the output rod, causing the threaded spindle to be radially supported all around at its front end area without play.

A solid state hinge is also referred to as flexure hinge, solid state joint, flexure joint, flexible joint or bending joint.

To form the sliding sleeve segments, the sliding sleeve is preferably provided with longitudinal slots at positions spaced apart from one another in the spindle peripheral direction, so that the sliding sleeve segments adjacent to one another are positioned at a distance from one another except for the resilient joints.

Especially when the resilient joints are realized as solid state hinges, the sliding sleeve can be manufactured particularly cost-effectively from plastic, especially as an injection-molded component.

If the resilient joints are realized as independent components by which sliding sleeve segments configured as separate components are connected to each other, the sliding sleeve segments can also preferably be made of plastic. The use of a thermoplastic material is recommended for any plastic manufacturing.

In principle, the sliding sleeve segments can be configured such that they only project axially from the resilient joints on one side, i.e., in the longitudinal direction of the spindle. Preferred, however, is an embodiment wherein the sliding sleeve segments are configured in a rocker-like manner and can each be swiveled in a rocker-like manner about the associated swivel area in a direction radial to the spindle longitudinal axis due to the resilient joints, wherein each sliding sleeve segment comprises two segment wings extending from its swivel area in opposite axial directions, at least one of which segment wings forms a support wing provided with one of the support area sections. When a rocker-like sliding sleeve segment swivels, one segment wing moves away from the spindle longitudinal axis, while the other segment wing moves closer to the spindle longitudinal axis.

In principle, both segment wings of a respective sliding sleeve segment could comprise a support area section. However, a configuration is considered to be particularly favorable wherein, of the two segment wings of each sliding sleeve segment, only one segment wing forms a support wing provided with a support area section, while the other segment wing is permanently spaced apart from the inner peripheral surface of the hollow output rod and mainly serves to fix the sliding sleeve to the rolling bearing carrying the sliding sleeve, which is why it is referred to as a fastening wing for better differentiation.

In the case of sliding sleeve segments configured as described above, it is preferable if the axial orientation of the two segment wings of the sliding sleeve segments adjacent to each other in the spindle peripheral direction is interchanged in such a way that the support wings point in axially opposite directions starting from the swivel area of the relevant sliding sleeve segment. The same applies to the fastening wings. In this case, the sliding sleeve is presented with two segment wing circles positioned axially next to each other in the longitudinal direction of the spindle, each consisting of support wings and fastening wings positioned alternately in succession in the spindle peripheral direction. The support area sections thus extend in particular in a meandering course around the spindle longitudinal axis.

On its radial inner circumference, the sliding sleeve is preferably provided with an annular seating area which is coaxial with the spindle longitudinal axis, points radially inwards towards the spindle longitudinal axis and with which the sliding sleeve is seated on a radial outer peripheral surface of an outer ring of the rolling bearing fixed to the threaded spindle by an inner ring. The radial outer peripheral surface of the outer ring of the rolling bearing is preferably circular-cylindrical in shape, with the annular seating area in particular having a complementary shape in this respect. In this way, the sliding sleeve is very effectively supported radially by the rolling bearing.

In particular, the sliding sleeve is configured such that its resilient joints are at the same axial height as the annular seating area, wherein the sliding sleeve segments project axially beyond the annular seating area, in particular axially on both sides in each case.

Preferably, the annular seating area of the sliding sleeve comprises a plurality of segment seating area sections positioned in succession in the spindle peripheral direction, each of which is formed on the radial inner surface of one of the sliding sleeve segments. These segment seating area sections are each bounded axially on only one side by a retaining surface, which is formed on a retaining projection formed on the associated fastening wing and projecting radially inwards. The retaining surface formed on each sliding sleeve segment, which is oriented in the longitudinal direction of the spindle, lies axially against one of the two axial end faces of the outer ring of the rolling bearing. In this way, the outer ring is held between retaining surfaces positioned at a distance from each other in the spindle peripheral direction and facing axially towards the segment seating area sections. The sliding sleeve thus has an annular fastening recess on its inner circumference, the base surface of which is formed by the annular seating area, and which is bounded laterally by a respective recess side surface, which is formed by a plurality of retaining surfaces positioned at a distance from one another in the spindle peripheral direction, the retaining surfaces of the two recess side surfaces being set with a gap between them.

The annular seating area of the sliding sleeve is preferably composed jointly of, on the one hand, the segment seating area sections positioned in succession at a distance in the spindle peripheral direction and, on the other hand, a number of hinge seating area sections corresponding to the number of resilient joints, the hinge seating area sections each being positioned between two successive segment seating area sections and each being formed on the radial inner surface of one of the resilient joints.

The sliding sleeve segments are preferably positioned in an inclined orientation with respect to the spindle longitudinal axis. In relation to a segment longitudinal axis of each sliding sleeve segment, which extends in a plane overlapping with the spindle longitudinal axis, in which the sliding sleeve segment is swivelable, and which can therefore be referred to as the swivel plane, the sliding sleeve segments are accordingly positioned such that the segment longitudinal axes are inclined with respect to the spindle longitudinal axis. Sliding sleeve segments adjacent to each other in the spindle peripheral direction or their segment longitudinal axes are preferably inclined in opposite directions.

If one considers the sliding sleeve in an initial state before insertion into the rod cavity, not mounted in its position of use, the segment longitudinal axes of the sliding sleeve segments are in each case more inclined than in the mounted position of use, in which they are pivoted into a state of lesser inclination by contact with the inner peripheral surface of the output rod, overcoming a spring-loaded restoring force. The spring force with which the sliding sleeve segments are elastically prestressed against the inner peripheral surface of the output rod results from the restoring force that builds up.

Each sliding sleeve segment has a radial segment outer surface facing the inner peripheral surface of the output rod, which in each case forms one of the support area sections. Preferably, the segment outer surface is convexly curved in the area of the support area section formed by it and preferably in its entirety both in the spindle peripheral direction and in the axial direction of the spindle longitudinal axis. The radius of curvature in the spindle peripheral direction corresponds at least essentially to the radius of the inner peripheral surface of the output rod. The curvature in the axial direction of the spindle longitudinal axis ensures that the outer segment surface is in contact with the cylindrical inner peripheral surface of the output rod, regardless of the current swivel position of the sliding sleeve segment.

Preferably, the sliding sleeve segments are each positioned tiltable on the rolling bearing to enable their radial swiveling. This possibility of tilting is favored in a fastening recess provided with axial retaining surfaces by the fact that the retaining surfaces are only present axially on one side of each sliding sleeve segment. The swiveling and the tilting are preferably one and the same movement.

The axial arrangement of retaining surfaces on only one side to create a mounting recess suitable for holding the outer ring of a rolling bearing also has the advantage that the sliding sleeve can be axially demolded very easily during injection molding production.

Preferably, the linear drive comprises a rotary drive apparatus positioned at the rear of the drive housing, which is coupled to the threaded spindle in a torque-transmitting manner to generate its drive rotary movement.

The rotary drive apparatus can certainly be configured as a fluid-actuated rotary drive apparatus. Preferably, however, an electric rotary drive apparatus is used and, in particular, an electric motor, with which very high speeds and consequently high traversing speeds of the output member can be realized. Preferably, the electric motor is a stepper motor that enables simple and reliable axial positioning of the output member in relation to the drive housing if required.

BRIEF DESCRIPTION OF THE DRAWINGS

The invention is explained in more detail below with reference to the enclosed drawing. It shows.

DETAILED DESCRIPTION

Figure 1:
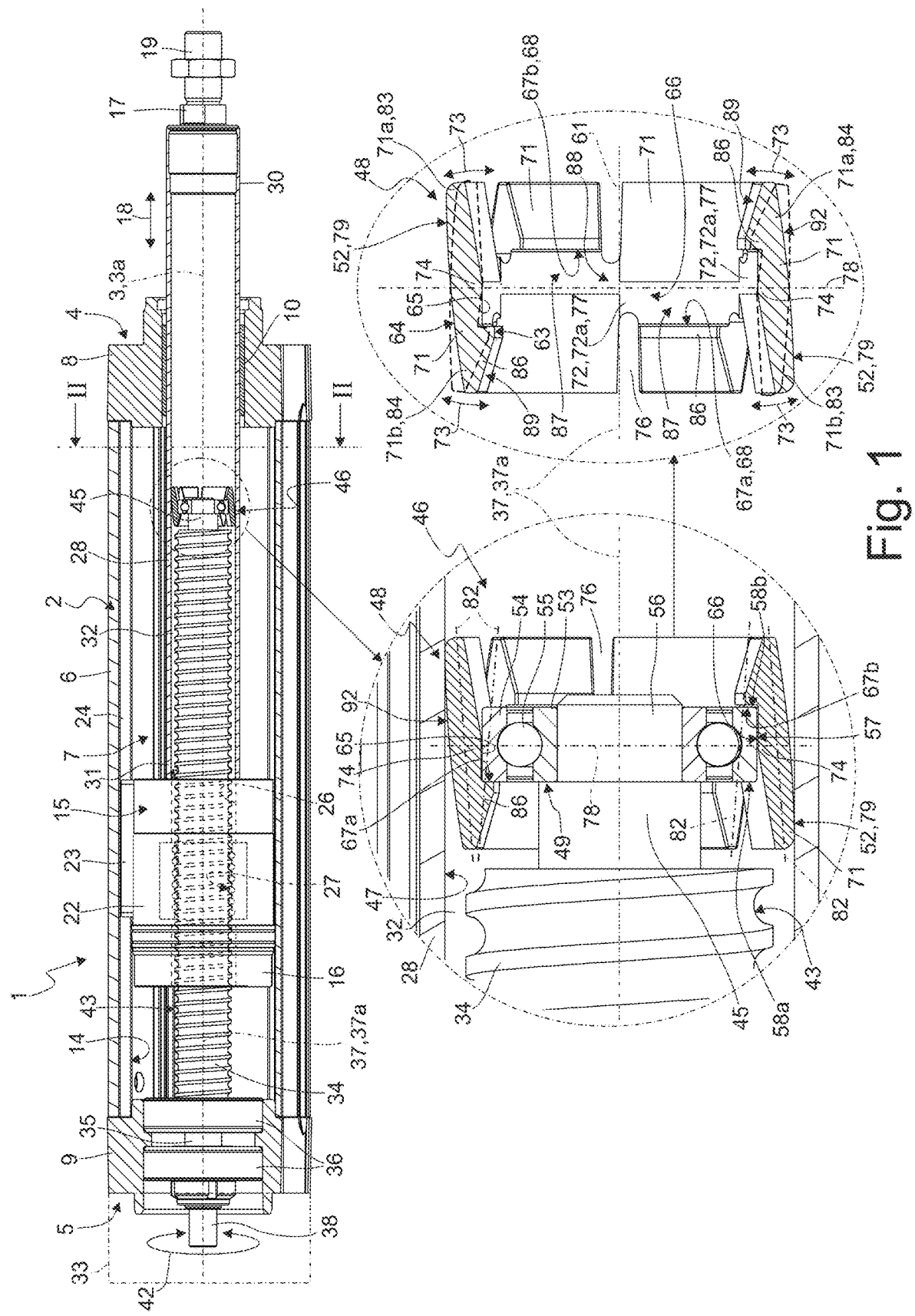
FIG. 1 a preferred embodiment of the linear drive according to the invention in a longitudinal section according to sectional plane I-I from FIG. 2, wherein the area of the support apparatus is illustrated separately, also enlarged again, and furthermore the sliding sleeve is shown in a further image section alone, FIG. 2 a cross-section of the linear drive according to sectional plane II-II from FIG. 1, and FIG. 3 a perspective view of the sliding sleeve included in the linear drive of FIGS. 1 and 2.

The linear drive 1 has a housing referred to as drive housing 2 with a central housing longitudinal axis 3 indicated by a dotted line, the axial direction of which is referred to as housing longitudinal direction 3a.

The drive housing 2 extends in the longitudinal direction of the housing 3a between a front side of the housing 4 and a rear side of the housing 5. The drive housing 2 encloses a housing interior 7.

Exemplarily, the drive housing 2 contains a front housing cover 8 positioned at the front of the housing 4, a rear housing cover 9 positioned at the rear of the housing 5 and a housing tube 6 extending between them in the longitudinal direction of the housing 3a.

Figure 2:
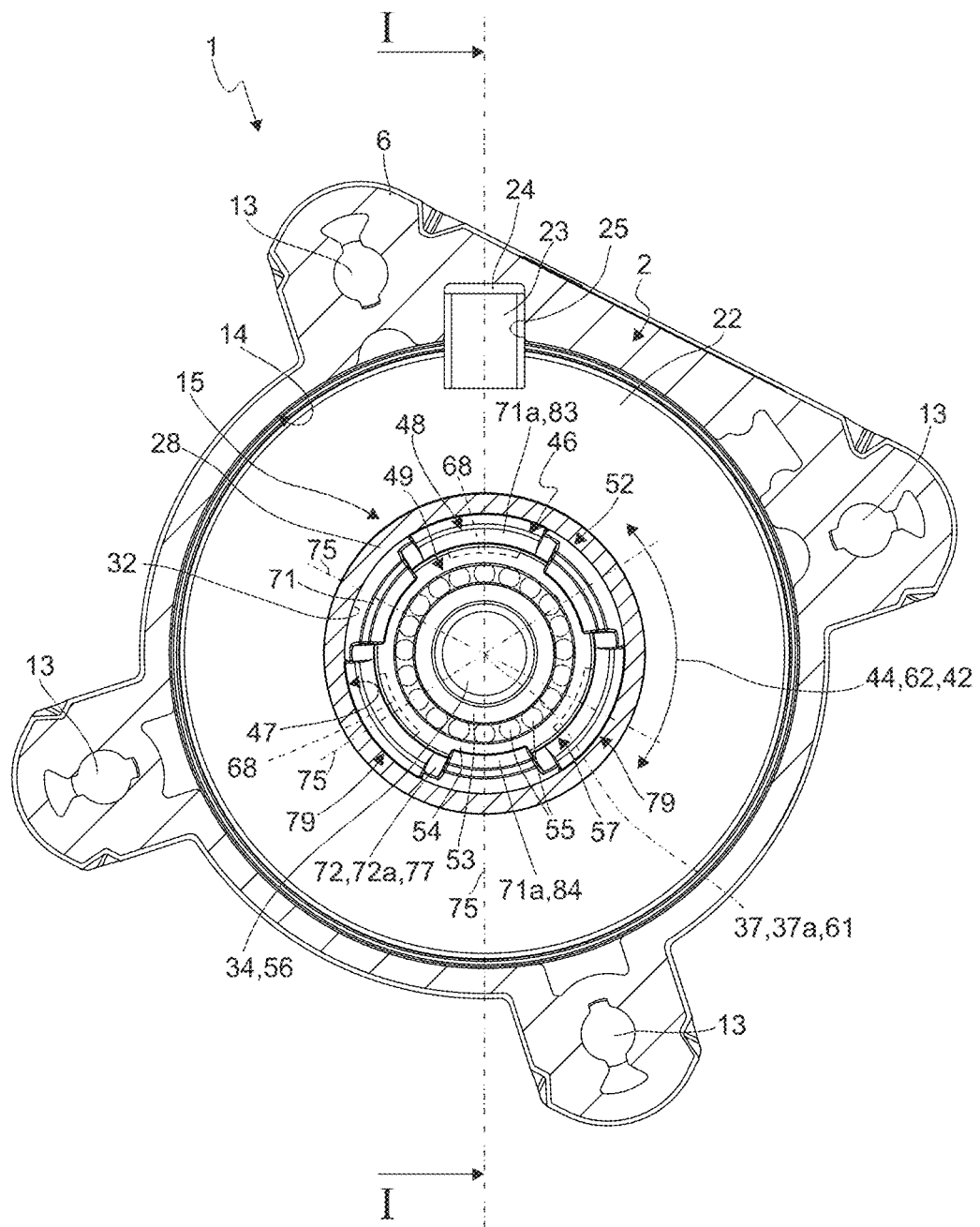

Preferably, the front and rear housing covers 8, 9 are attached to the respective end face of the housing tube 7 and axially braced to the housing tube 6 by means of several fastening screws. As an example, the housing tube 6 has a plurality of fastening holes 13, as shown in FIG. 2, into which the fastening screws engage.

The housing tube 6 has a radially inner tube circumferential surface 14 peripherally delimiting the housing interior 7, which preferably extends in the longitudinal direction of the housing 3a over the entire length of the tube.

The linear drive 1 also has a multi-part output member 15 with a longitudinal shape. The output member 15 extends in the housing interior 7 in the longitudinal direction 3a, preferably being positioned coaxially to the housing tube 6.

The output member 15 has a rear end section 16 positioned in the housing interior 7 and facing the rear of the housing 5 and a front end section 17 projecting out of the drive housing 2 at the front of the housing 4. The output member 15 passes through the front housing cover 8 as an example, being enclosed by a guide bush 10 fixed in the front housing cover 8 and guided for linear displacement with radial support.

When the linear drive 1 is used, the output member 15 can be driven in two opposite axial directions relative to the drive housing 2 in a linear output movement 18 indicated by a double arrow. The anterior end section 17 of the output member 15, which is always located outside the drive housing 2, can be used to apply force, whereby it preferably has a force-applying structure 19 to which any component to be moved can be fixed, for example a machine element to be moved.

Depending on the direction of movement, the linear output movement 18 manifests itself in an extension or retraction of the output member 15 with respect to the drive housing 2.

The output member 15 includes a spindle nut 22 positioned in the housing interior 7, which is secured against rotation with respect to the drive housing 2. The anti-rotation lock prevents the spindle nut 22 from rotating relative to the drive housing 2 about the housing longitudinal axis 3. However, the spindle nut 22 can easily follow the linear output movement 18.

The anti-rotation lock of the spindle nut 22 is exemplarily realized in that a radially protruding anti-rotation projection 23 is positioned radially on the outside of the spindle nut 22, which is inserted into an anti-rotation groove 24 of the drive housing 2 provided with a complementary cross-section. The anti-rotation groove 24 is formed on the inner circumferential surface 14 of the tube and extends as a longitudinal groove between the two housing covers 8, 9, wherein it has a slot-like groove opening 25 facing the housing interior 7. The anti-rotation projection 23 is inserted through the groove opening 25 into the anti-rotation groove 24 and can move in the longitudinal direction of the anti-rotation groove 24 during the output movement 18. The support of the anti-rotation projection 23 on the two groove flanks of the anti-rotation groove 24 results in the aforementioned anti-rotation of the spindle nut 22. For example, the anti-rotation projection 23 is ridge-shaped.

According to an embodiment not illustrated, the anti-rotation lock of the spindle nut 22 can also be realized by the housing interior 7 having a non-circular cross-section and the spindle nut 22 having a complementary cross-sectional contour in this respect.

The spindle nut 22 is axially penetrated centrally by a through opening 26, which is provided with an internal thread 27 on its inner circumference. The internal thread 27 is preferably realized with a recirculating ball principle and includes a plurality of rolling bearing balls that can circulate in a closed ball channel system, which consists of a helical groove in the area of the inner circumference of the through opening 26, from which the rolling bearing balls partially protrude. In principle, however, the internal thread 27 can also be realized in another way.

The output member 15 further comprises a hollow output rod 28, which extends coaxially to the housing longitudinal axis 3 and passes through the front housing cover 8 in an axially displaceable manner in this respect. An outer end section 30 of the hollow output rod 28 located outside the drive housing 2 forms the front end section 17 of the output member 15 and, by way of example, carries the force-applying structure 19. An inner end section 31 of the output rod 28 is located in the housing interior 7 and is attached there to the spindle nut 22 in such a way that a cavity extending axially in the output rod 28, referred to as rod cavity 32, is aligned with the through opening 26 of the spindle nut 22.

Since the rod cavity 32 is open at the rear, i.e., at the inner end section 31, the through opening 26 and the rod cavity 32 merge axially into one another.

The spindle nut 22 is coupled to the output rod 28 in any desired way in the longitudinal direction of the housing 3a. This means that the output rod 28 follows every movement of the spindle nut 22 in the longitudinal direction of the housing 3a. For example, the two parts are welded or pressed together.

The linear drive 1 has a rotary drive apparatus 33, which is preferably positioned in the area of the rear of the housing 5 on the drive housing 2 and, in particular, is attached to it. The rotary drive apparatus 33 is only indicated schematically in the drawing.

The rotary drive apparatus 33 is connected in terms of drive to a threaded spindle 34, which projects axially into the housing interior 7 starting from a rear end section of the drive housing 2, which is formed by the rear housing cover 9 as an example. The threaded spindle 34 has a spindle longitudinal axis 37, the axial direction of which is referred to as spindle longitudinal axis 37a and which preferably has the same orientation as the housing longitudinal axis 3.

Preferably, the spindle longitudinal axis 37 and the housing longitudinal axis 3 overlap, which applies to the embodiment shown.

The threaded spindle 34 has a rear end section 35, which is rotatably mounted via a rotary bearing apparatus 36 of any type in the rear end section of the drive housing 2, formed for example by the rear housing cover 9, so that it can rotate relative to the drive housing 2 about its spindle longitudinal axis 37 and at the same time is radially supported. The pivot bearing apparatus 36 is preferably configured as a roller bearing apparatus.

The rotary drive apparatus 33 is connected to the threaded spindle 34 in a torque-transmitting manner, which is exemplarily realized in that the threaded spindle 34 has a torque introduction section 38 on the rear side, which is connected to a drive shaft of the rotary drive apparatus 33 via a coupling apparatus.

The rotary drive apparatus 33 enables the threaded spindle 34 to be driven rotationally in one of two opposing directions of rotation to a drive rotary movement 42 about the spindle longitudinal axis 37, indicated by a double arrow.

Preferably, the rotary drive apparatus 33 is of an electrical type, wherein it is preferably configured as an electric motor, which applies to the illustrated embodiment example. In particular, the rotary drive apparatus 33 is an electric stepper motor.

The threaded spindle 34 extends through the through opening 26 of the spindle nut 22 and protrudes into the rod cavity 32 of the output rod 28. The threaded spindle 34 has an external thread 43 on its outer circumference, which is in threaded engagement with the internal thread 27 of the spindle nut 22.

Preferably, the threaded spindle 34 extends in the housing interior 7 at least approximately into the area of the exemplary front end section of the drive housing 2 formed by the front housing cover 8.

One direction around the spindle longitudinal axis 37 is referred to as the spindle peripheral direction 44 and is indicated in the drawing by a double arrow. The drive rotary movement 42 takes place in the spindle peripheral direction 44 either clockwise or counterclockwise. Due to the threaded engagement of the output rod 28 with the spindle nut 22, which is secured against rotation with respect to the drive housing 2, a drive rotary movement 42 of the threaded spindle 34 results in the linear output movement 18 of the output member 15 already mentioned above. The direction of movement of the output movement 18 depends on the direction of rotation of the drive rotary movement 42.

The output rod 28 has an anterior end section 45 which ends freely in the rod cavity 32 and is supported by a support apparatus 46 of the linear drive 1 on the inner peripheral surface 47 of the hollow output rod 28, which radially delimits the rod cavity 32, in a radial direction with respect to the spindle longitudinal axis 37, without impeding the linear displaceability of the output member 15 and the rotational movement of the threaded spindle 34 required with respect to the output member 15.

The support apparatus 46 includes a sliding sleeve 48 and an annular rolling bearing 49. The rolling bearing 49 is seated coaxially on the anterior end section 45 of the threaded spindle 34 and carries the sliding sleeve 48, which is also positioned coaxially to the threaded spindle 34. A support area 52 is formed radially on the outside of the sliding sleeve 48, which extends in the spindle peripheral direction 44 around the spindle longitudinal axis 37 and bears against the inner peripheral surface 47 of the output rod 28. During the output movement 18, the output rod 28 slides with its inner peripheral surface 47 against the support area 52.

Due to an advantageous structure of the sliding sleeve 48, which will be explained below, its support area 52 is constantly resiliently prestressed against the inner peripheral surface 47. This results in radially clearance-free support of the anterior end section 45 of the threaded spindle 34 on the output rod 28. As a result, the rotation of the threaded spindle 34 is very smooth while undesirable vibrations are avoided.

The rolling bearing 49 enables the threaded spindle 34 to rotate relative to the sliding sleeve 48. Relative movements between the sliding sleeve 48 and the output rod 28 are therefore predominantly limited to translational movements in the longitudinal direction of the housing 3a with no or only slightly superimposed rotational movements in the spindle peripheral direction 44. This separation of rotational and translational movements reduces the relative speed at the contact areas between the support area 52 and the inner peripheral surface 47, which also contributes to a reduction in running noise and also minimizes friction-related wear.

The rolling bearing 49 has an inner ring 53, an outer ring 54 coaxially surrounding the inner ring 53 with radial spacing and a plurality of rolling elements 55 positioned in a rolling manner between the inner ring 53 and the outer ring 54. In particular, this is a radial rolling bearing in which the rolling elements 55 enable radial force transmission between the inner ring 53 and the outer ring 54.

As an example, the rolling bearing 49 is configured as a ball bearing with rolling balls as rolling elements 55. The rolling bearing 49 can also be configured as a roller bearing with rolling rollers as rolling elements 55.

The rolling bearing 49 is seated with its inner ring 53 on the anterior end section 45 of the output rod 28. The output rod 28 ends, by way of example, with a cylindrical bearing extension 56, which is coaxially enclosed by the inner ring 53. Preferably, the rolling bearing 49 is fixed with its inner ring 53 in a press fit on the bearing extension 56. Other fastening measures, for example axially immovable fastening by means of a retaining ring, are also possible.

The outer ring 54 has a preferably cylindrical radial outer peripheral surface 57 and axially on both sides of this outer peripheral surface 57 one of two oppositely oriented annular axial end faces 58a, 58b. The outer ring 54 can rotate around the inner ring 53, with the rolling elements 55 rolling on the inner peripheral surfaces of the inner ring 53 and the outer ring 54.

An annular groove is formed in the outer circumference of the inner ring 53 and in the inner circumference of the outer ring 54, into which the rolling elements 55 are partially inserted, wherein the resulting axial form fit has the effect that the outer ring 54 is fixed axially immovable with respect to the inner ring 53.

The sliding sleeve 48 has a central longitudinal sleeve axis 61, which overlaps with the spindle longitudinal axis 37 in the operational position of use of the sliding sleeve 48. A sleeve peripheral direction 62, illustrated by the same double arrow as the spindle peripheral direction 44, runs around the sleeve longitudinal axis 61 and thus also around the spindle longitudinal axis 37.

The sliding sleeve 48 has an inner peripheral surface 63 facing the sleeve longitudinal axis 61 and an outer peripheral surface 64 facing away radially with respect to the sleeve longitudinal axis 61. An annular fastening recess 65 coaxial with the sleeve longitudinal axis 61 is formed on the inner peripheral surface 63, by means of which the sliding sleeve 48 is seated on the outer ring 54. At least a section of the radial height of the outer ring 54 is inserted into the fastening recess 65, so that the outer ring 54 and the sliding sleeve 48 are fixed immovably relative to one another in the longitudinal direction of the spindle 37a.

The fastening recess 65 has a radially inwardly pointing circular base surface, referred to in the following as seating area 66, which extends uninterruptedly around the longitudinal axis 61 of the sleeve. The seating area 66 encloses the radial outer peripheral surface 57 of the outer ring 54 and is supported radially thereon.

Laterally, the fastening recess 65 is limited by two recess side surfaces 67a, 67b facing each other, each of which is supported on one of the two axial end faces 58a, 58b of the outer ring 54. In this way, the sliding sleeve 48 is fixed axially immovably to the outer ring 54 of the rolling bearing 49.

The two recess side surfaces 67a, 67b are each segmented in the sleeve circumferential direction 62 and are formed of a plurality of circular arc-shaped side surface portions which follow each other at a distance in the sleeve circumferential direction 62 and are hereinafter referred to as retaining surfaces 68. Opposite each retaining surface 68 of each recess side surface 67a, 67b is an area of the respective other recess side surface 67b, 67a which has no retaining surface and is thus axially open in the axial direction of the sleeve longitudinal axis 61.

The outer ring 54 is preferably clamped between the retaining surfaces 68 of the two recess side surfaces 67a, 67b. Normally, therefore, no rotational relative movements take place between the sliding sleeve 48 and the outer ring 54 during operation of the linear drive 1. The threaded spindle 34 can therefore rotate relative to the sliding sleeve 48 held on the outer ring 54 during its drive movement 42.

Depending on the radial contact pressure prevailing between the support area 52 and the inner peripheral surface 47 of the output rod 28, on the intensity of the clamping of the sliding sleeve 48 on the outer ring 54 and on the internal friction of the rolling bearing 49, the rotating threaded spindle 34 can possibly also cause a rotation of the sliding sleeve 48 about the spindle longitudinal axis 37, so that not only translational relative movements in the longitudinal spindle direction 37a but also rotational relative movements in the spindle peripheral direction 44 occur between the sliding sleeve 48 and the output rod 28, although the rotational speed of the sliding sleeve 48 is considerably lower than that of the threaded spindle 34. An effort will be made to configure the design in such a way that the sliding sleeve 48 performs no or at least only minimal rotational movements relative to the output rod 28.

Insofar as the sleeve peripheral direction 62 is referred to in the following and no deviating information is provided in individual cases, this also refers to the spindle peripheral direction 44, and vice versa. The same applies to the spindle longitudinal axis 37 on the one hand and the sleeve longitudinal axis 61 on the other.

A special feature of the structure of the sliding sleeve 48 is that it is segmented in the spindle peripheral direction 44, which is expressed by the fact that it is subdivided in the spindle peripheral direction 44 or the sleeve peripheral direction 62 into a plurality of sliding sleeve segments 71 positioned in succession. However, the sliding sleeve 48 nevertheless is a coherent ring structure, since adjacent sliding sleeve segments 71 in the sleeve circumferential direction 62 are each connected to one another via a resilient joint 72 of the sliding sleeve 48. These resilient joints 72 enable the individual sliding sleeve segments 71 to swivel independently of one another both relative to one another and relative to the rolling bearing 49 in a radial direction with respect to the spindle longitudinal axis 37. The possible swivel movement 73 of the sliding sleeve segments 71, which is also referred to below as segment swivel movement 73, is indicated in the drawing by double arrows.

During the segment swivel movement 73, the sliding sleeve segment 71 in question swivels about a swivel area 74, which could also be referred to as the swivel center and which is defined by the two resilient joints 72, on which each sliding sleeve segment 71 is resiliently suspended.

The segment swivel movement 73 takes place for each sliding sleeve segment 71 in a swivel plane 75 indicated by a dotted line, which is spanned by the spindle longitudinal axis 37 and a radial axis passing through the relevant sliding sleeve segment 71.

The spring elasticity of the joints 72 results, by way of example, from their configuration as elastically deformable solid state hinges 72a. For this purpose, adjacent sliding sleeve segments 71 are separated from one another in the spindle peripheral direction 44 by means of radially continuous longitudinal slots 76, whereby these longitudinal slots 76 do not, however, completely penetrate the sliding sleeve 48 axially, so that a narrow bar section 77 remains, which is formed in one piece and connects the two adjacent sliding sleeve segments 71 to one another in one piece. This bar section 77 defines a material bar which has the properties of a torsion spring bar and can be twisted about a torsion axis which is aligned in the sleeve circumferential direction 62.

By way of example, the bar sections 72 each have an at least substantially rectangular cross-section.

The sliding sleeve 48 is therefore preferably formed as a single piece, whereby it is composed of sliding sleeve segments 71 and solid state hinges 72a that merge into one another as a single material. Preferably, the sliding sleeve 48 is made of a plastic and, in particular, of a thermoplastic.

Preferably, all resilient joints 72 lie together in a plane 78 orthogonal to the spindle longitudinal axis 37, which is referred to as hinge plane 78 for better differentiation. Accordingly, the swivel areas 74 of all sliding sleeve segments 71 also lie in said hinge plane 78.

According to an illustrated preferred embodiment, the sliding sleeve segments 71 are configured in a rocker-like manner and are suspended by the resilient joints 72 in such a way that they are each pivoted in a rocker-like manner when the segment swiveling movement 73 is executed. Each sliding sleeve segment 71 has a first segment wing 71a and a second segment wing 71b, these two segment wings 71a, 71b projecting in opposite axial directions of the sleeve longitudinal axis 61 starting from the swivel area 74 in which the resilient joints 72 engage and each ending freely. One of the longitudinal slots 76 extends between each of the resilient joints 72 and the free ends of the segment wings 71a, 71b. During the segment swiveling movement 73, the respective segment wing 71a or 71b approaches the spindle longitudinal axis 37, while at the same time the respective other segment wing 71b, 71a moves away from the spindle longitudinal axis 37. Different swivel positions of the sliding sleeve segments 71 are strongly exaggerated in the enlarged individual representation of the sliding sleeve 48 by means of dashed contours.

The support area 52 is also segmented in the spindle peripheral direction 44 in accordance with the segmentation of the sliding sleeve 48. The support area 52 is formed from a number of support area sections 79 corresponding to the number of sliding sleeve segments 71, each of which is formed on one of the sliding sleeve segments 71. Accordingly, the support area 52 is not a closed annular area but is interrupted in each of the joint areas of the sliding sleeve 48.

Each individual support area section 79 is elastically flexibly pressed against the inner peripheral surface 47 of the output rod 28 with a spring force due to the spring-elastic effect of the solid state hinges 72a present as an example.

Figure 3:
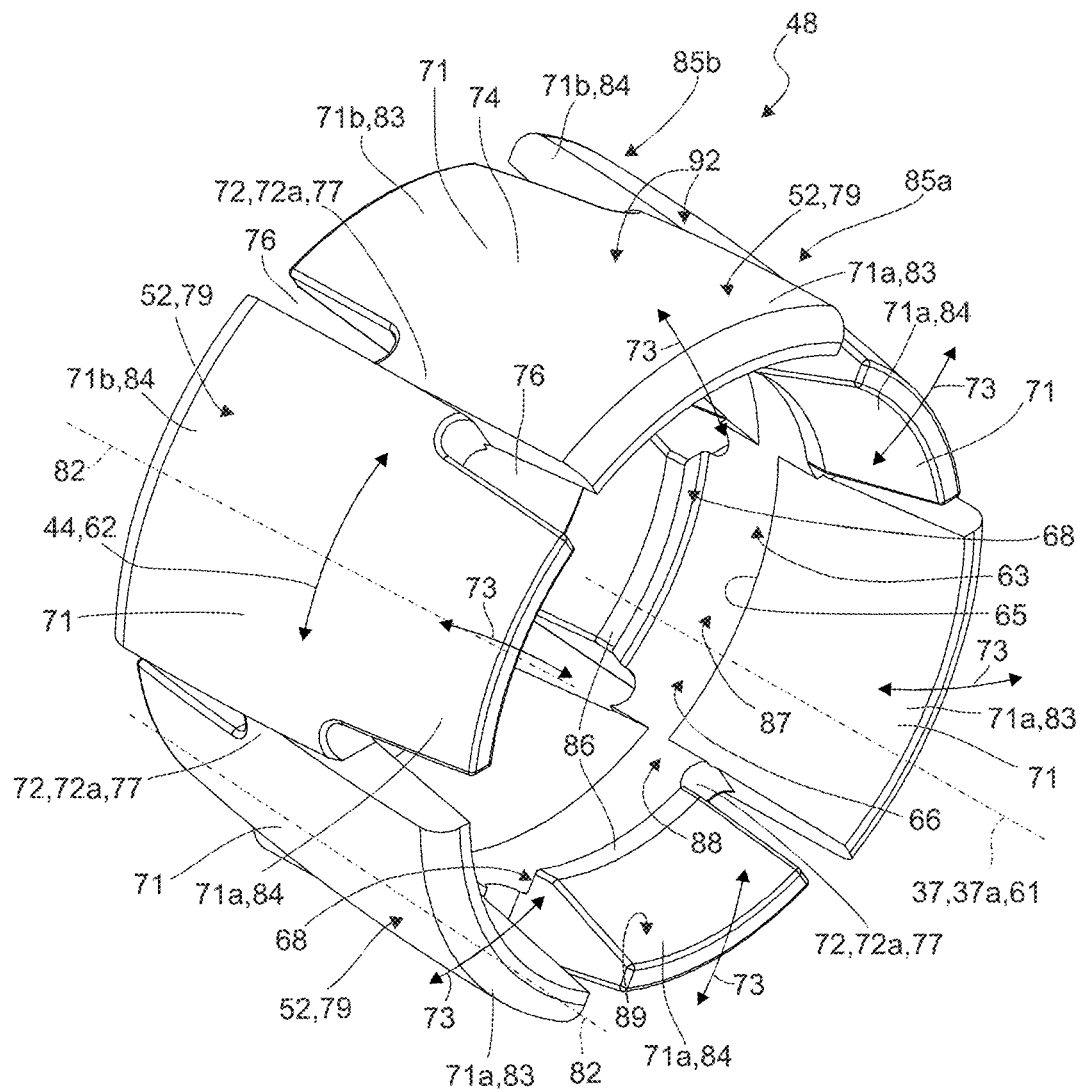

The resilient compressive force results, by way of example, from a structure of the sliding sleeve 48 such that the sliding sleeve segments 71 are pressed radially inwards against a resilient restoring force of the resilient joints 72 when the sliding sleeve 48 is inserted into the rod cavity 32 from a stress-neutral initial position shown in FIG. 3. In the stress-neutral initial state with the sliding sleeve 48 not mounted, the outer area sections 79 lie on a circle with a larger diameter compared to the rod cavity 32, so that they are pivoted inwards when the sliding sleeve 48 is pushed into the rod cavity 32, building up a rebounding support force.

To explain this effect, reference is made to the fact that each sliding sleeve segment 71 has a segment longitudinal axis 82 indicated by a dotted line, which extends, by way of example, between the free end regions of the two segment wings 71a, 71b and which lies in the above-mentioned swivel plane 75 of the relevant sliding sleeve segment 71. These segment longitudinal axes 82 are inclined with respect to the sleeve longitudinal axis 61, wherein they form an acute angle with the sleeve longitudinal axis 61 in the associated swivel plane 75. In the unassembled initial position according to FIG. 3, the segment longitudinal axes 82 are more inclined than in the assembled position of use according to FIG. 1. This change in inclination causes the desired resilient support of the sliding sleeve segments 71 on the inner peripheral surface 47 of the hollow output rod 28.

Preferably, the support area sections 79 do not extend over the entire length of the respectively assigned sliding sleeve segment 71, but are each limited to one of the two segment wings 71a, 71b. The segment wing 71a or 71b having the support area section 79 is hereinafter also referred to as support wing 83.

The segment wing 71a or 71b, which does not function as support wing 83, is always radially spaced apart from the inner peripheral surface 47 of the hollow output rod 28. The section of the outer peripheral surface 64 of the sliding sleeve 48 formed on it has no contact with the inner peripheral surface 47. This results from the fact that the sliding sleeve segments 71 are inclined with respect to the longitudinal axis 61 of the sleeve not only in the initial position, but also in the position of use of the sliding sleeve 48.

The segment wings 71a or 71b, which are spaced apart from the inner peripheral surface 47 and do not perform a supporting function, are referred to below as fastening wings 84, as they play a decisive role in fastening the sliding sleeve 48 to the outer ring 54 of the rolling bearing 49.

Starting from the swivel area 74, all first segment wings 71a project in the same axial direction, namely, by way of example, axially away from the threaded spindle 34 in the direction of the front side of the housing 4. All second segment wings 71b are oriented in the opposite direction and project in the direction of the threaded spindle 34 and thus in the direction of the rear side of the housing 5. The sliding sleeve 48 thus has two segment wing circles 85a, 85b positioned next to one another in the longitudinal direction of the spindle 37a, a first segment wing circle 85a being formed by the first segment wings 71a and a second segment wing circle 85b being formed by the second segment wings 71b.

A preferred special feature of the sliding sleeve 48 realized in the embodiment is that the axial orientation of the sliding sleeve segments 71 directly adjacent to each other in the spindle peripheral direction 44 is reversed in such a way that the support wings 83 and the fastening wings 84 point in axially opposite directions. In other words, both the first segment wing circle 85a and the second segment wing circle 85b are formed from support wings 83 and fastening wings 84 positioned alternately in the spindle peripheral direction 44. Among other things, this also has the consequence that the support area sections 79 of respectively adjacent sliding sleeve segments 71 in the spindle peripheral direction 44 are offset relative to one another in the spindle longitudinal direction 37a. This is accompanied by an opposing inclination of the segment longitudinal axes 82 of the sliding sleeve segments 71 directly following each other in the spindle peripheral direction 44 with respect to the spindle longitudinal axis 37.

The relevant first or second segment wings 71a, 71b obtain their functionality as fastening wings 84 from the fact that the retaining surfaces 68 described above, which contribute to the formation of the fastening recess 65, are formed on them. The interchanged axial orientation of adjacent sliding sleeve segments 71 described above means that the retaining surfaces 68 are positioned with a gap in the spindle peripheral direction 44 and are oriented in opposite directions to one another. Each retaining surface 68 is located on a radially inwardly projecting retaining projection 86 of the fastening wing 84.

The annular seating area 66 is composed of segment seating area sections 87 formed radially on the inside of the individual sliding sleeve segments 71, each of which is axially bounded on one side by one of the retaining surfaces 68, and of hinge seating area sections 88 formed on the radially inner surface of the resilient joints 72 or the solid state hinges 72a.

Preferably, the resilient joints 72 are at the same axial height with the annular seating area 66 in relation to the axial direction of the sleeve longitudinal axis 61, with the sliding sleeve segments 71 projecting axially with their segment wings 71a, 71b beyond the annular seating area 66.

The retaining projections 86 have, on their radially inner side axially adjacent to the retaining surface 68, preferably an insertion slope 89 extending obliquely radially outwards in the direction of the free end of the fastening wing 84. Together, the insertion slopes 89 of both segment wing circles 85a, 85b each form an insertion region tapering conically from the axial outside in the direction of the fastening recess 65, which could also be described as an insertion funnel. To mount it on the rolling bearing 49, the sliding sleeve 48 can be pushed onto the rolling bearing 49 with one of the insertion areas in front, wherein the insertion slopes 89 slide along the outer ring 54, whereby the sliding sleeve segments 71 are pressed outwards with a segment swivel movement 73 until the rolling bearing 49 has passed the associated retaining surfaces 68. The sliding sleeve segments 71 then snap back again and the outer ring 54 is fixed between the retaining surfaces 68. The sliding sleeve 48 can therefore be very easily snapped onto the rolling bearing 49 in an axial insertion process.

The sliding sleeve segments 71 can automatically align themselves in terms of inclination according to the inner diameter of the rod cavity 32 by performing corresponding segment swivel movements 73 during the drive movement 42 of the threaded spindle 34. The segment swivel movements 73 each affect the entire sliding sleeve segment 71, which has a corresponding rigidity. Since this may be accompanied by tilting with respect to the outer ring 54, the actual contact area between the seating surface 66 and the radial outer peripheral surface 57 of the outer ring 54 generally also changes during the segment swivel movement 73.

Each sliding sleeve segment 71 has a radial outer segment surface 92 facing the inner peripheral surface 47 of the hollow output rod 28. Each support area section 79 is formed by a partial area of the associated outer segment surface 92.

The segment outer surfaces 92 are each convexly curved in the spindle peripheral direction 44 at least in the region of the support area sections 79, the curvature corresponding to the curvature of the inner peripheral surface 47, so that the sliding sleeve segments 71 can bear against the inner peripheral surface 47 along their entire width extending in the spindle peripheral direction 44. Preferably, the curvatures of the inner peripheral surface 47 and the segment outer surfaces 92 are complementary to each other.

Preferably, the segment outer surfaces 92 are convexly curved not only in the spindle peripheral direction 44, but also in the spindle longitudinal direction 37a, at least in the area of the support area sections 79. This preferably results in a convex surface shape. This measure realized in the embodiment has the effect that the support area sections 79 are always in relatively large contact with the inner peripheral surface 47, regardless of the current swivel position of the sliding sleeve segments 71. During the segment swivel movement 73, the current contact area between the inner peripheral surface 47 and the support area sections 79 can move along the segment outer surface 92 in the longitudinal spindle direction 37a. As already mentioned, the segment outer surfaces 92 can each have a spherical contour overall. It is preferred to intentionally omit a cylindrical contour.

Since the contact points between the sliding sleeve segments 71 and the inner peripheral surface 47 are offset from each other in the longitudinal direction of the spindle 37a—they are located axially on both sides of the resilient joints 72—, wherein the sliding sleeve segments 71 are each spring-loaded to the inner peripheral surface 47 of the hollow output rod 28 with no clearance, this results in a very effective radial support of the anterior end section 45 of the threaded spindle 34 regardless of the current axial position of the output member 15.

The invention claimed is:

1. A linear drive, comprising:
a drive housing extending along a housing longitudinal axis, which drive housing encloses a housing interior in which a linearly movable output member extends axially, which output member projects out of the drive housing with an anterior end section usable for force applying and which output member has a hollow output rod in which a rod cavity open at the rear is formed,
wherein the output member has a spindle nut which is arranged in the housing interior and is secured against rotation with respect to the drive housing, wherein a threaded spindle passes through the spindle nut, wherein the threaded spindle is in threaded engagement with the spindle nut and has a spindle longitudinal axis extending in the axial direction of the housing longitudinal axis, which threaded spindle, starting from a rear end section of the drive housing, projects through the spindle nut into the rod cavity and configured to be driven by a rotary drive apparatus, which performs a rotary drive movement about the spindle longitudinal axis, resulting in a linear output movement of the output member relative to the drive housing, wherein an anterior end section of the threaded spindle positioned in the rod cavity is radially supported on an inner peripheral surface of the output rod radially bounding the rod cavity by a support apparatus which has a sliding sleeve coaxial with the threaded spindle, on which sliding sleeve a support area extending in a spindle peripheral direction around the spindle longitudinal axis is formed radially on the outside, along which support area the output rod slides with its inner peripheral surface during its output movement, wherein the support apparatus has a rolling bearing positioned on the threaded spindle and supporting the sliding sleeve, which rolling bearing allows the threaded spindle to rotate relative to the sliding sleeve, and wherein the sliding sleeve is divided into a plurality of sliding sleeve segments which are positioned in succession in the spindle peripheral direction and are connected to one another via resilient joints, so that they can be pivoted independently of one another in a radial direction relative to one another and relative to the rolling bearing by a respective swivel area with respect to the spindle longitudinal axis, wherein the support area is formed by support area sections formed on the individual sliding sleeve segments and elastically flexibly prestressed against the inner peripheral surface of the output rod by the resilient joints.

2. The linear drive according to claim 1, wherein the swivel areas of all sliding sleeve segments defined by the resilient joints lie in a common hinge plane orthogonal with respect to the spindle longitudinal axis.

3. The linear drive according to claim 1, wherein the resilient joints are each configured as solid state hinges positioned between two sliding sleeve segments which are adjacent to one another in the spindle peripheral direction and each solid state hinge consists of a bar section of the sliding sleeve which is connected in one piece to the two adjacent sliding sleeve segments and configured to be twisted resiliently.

4. The linear drive according to claim 1, wherein the sliding sleeve is longitudinally slotted at positions spaced apart from one another in the spindle peripheral direction to form the sliding sleeve segments.

5. The linear drive according to claim 1, wherein the sliding sleeve is made of a plastic.

6. The linear drive according to claim 1, wherein the sliding sleeve segments are configured in a rocker-like manner and configured to be swiveled in a rocker-like manner about the associated swivel area in a direction radial to the spindle longitudinal axis due to the resilient joints, wherein each sliding sleeve segment comprises two segment wings extending from its swivel area in opposite axial directions, at least one of which segment wings forms a support wing provided with one of the support area sections.

7. The linear drive according to claim 6, wherein of the two segment wings of each sliding sleeve segment, only one segment wing forms a support wing, while the other segment wing is configured as a fastening wing which is spaced apart from the inner peripheral surface of the hollow output rod and contributes to fixing the sliding sleeve to the rolling bearing.

8. The linear drive according to claim 7, wherein for each sliding sleeve segments which are adjacent in the spindle peripheral direction, the axial orientation of the two segment wings is interchanged in such a way that their support wings point in axially opposite directions starting from the swivel area and the sliding sleeve comprises two segment wing circles positioned axially next to each other with support wings and fastening wings positioned alternately in succession in the spindle peripheral direction.

9. The linear drive according to claim 1, wherein the sliding sleeve comprises on its radial inner circumference an annular seating area which is coaxial with the spindle longitudinal axis and points radially inwards and with which annular seating area the sliding sleeve is seated on a radial outer peripheral surface of an outer ring of the rolling bearing fixed with an inner ring to the threaded spindle.

10. The linear drive according to claim 9, wherein the resilient joints of the sliding sleeve are at the same axial height as the annular seating area, wherein the sliding sleeve segments project axially beyond the annular seating area.

11. The linear drive according to claim 9, wherein the annular seating area of the sliding sleeve comprises a plurality of segment seating area sections which are positioned in succession in the spindle peripheral direction and are each formed on the radially inner surface of one of the sliding sleeve segments and which segment seating area sections are each axially bounded on one side by a retaining surface, which is formed on a retaining projection formed on the associated fastening wing and projecting radially inwards and with which retaining surface the associated sliding sleeve segment bears axially against one of the two axial end faces of the outer ring of the rolling bearing, so that the outer ring is held between retaining surfaces positioned at a distance from one another in the spindle peripheral direction and facing axially towards the segment seating area sections.

12. The linear drive according to claim 11, wherein the annular seating area of the sliding sleeve comprises a plurality of hinge seating area sections each positioned between two segment seating area sections positioned in succession in the spindle peripheral direction, which hinge seating area sections are formed on the radial inner surface of the resilient joints.

13. The linear drive according to claim 1, wherein each sliding sleeve segment has a segment longitudinal axis which lies in a swivel plane of the sliding sleeve segment overlapping with the spindle longitudinal axis and which segment longitudinal axis is inclined with respect to the spindle longitudinal axis, the segment longitudinal axes having an opposite inclination in the spindle peripheral direction of adjacent sliding sleeve segments.

14. The linear drive according to claim 13, wherein the segment longitudinal axis of each sliding sleeve segment has a greater inclination before insertion of the sliding sleeve into the rod cavity than in the position of use of the sliding sleeve inserted into the rod cavity and supported on the inner peripheral surface of the output rod.

15. The linear drive according to claim 1, wherein each sliding sleeve segment has a radial segment outer surface facing the inner peripheral surface of the output rod, wherein the support area sections of the sliding sleeve segments are each formed by a section of the radial segment outer surface of the associated sliding sleeve segment and wherein each segment outer surface is convexly curved at least in the region of the support area section both in the spindle peripheral direction and in the axial direction of the spindle longitudinal axis.

16. The linear drive according to claim 1, wherein the sliding sleeve segments are each positioned on the rolling bearing so as to be tiltable with respect to the rolling bearing in order to enable their radial swiveling.

17. The linear drive according to claim 1, wherein a rotary drive apparatus is positioned at the rear of the drive housing.

18. The linear drive according to claim 17, wherein the rotary drive apparatus is an electric rotary drive apparatus.

19. The linear drive according to claim 15, wherein each segment outer surface is convexly curved in its entirety both in the spindle peripheral direction and in the axial direction of the spindle longitudinal axis.

20. The linear drive according to claim 18, wherein the rotary drive apparatus is formed by an electric motor.

\* \* \* \* \*